United States Patent
Ellington et al.

(10) Patent No.: US 7,387,168 B2
(45) Date of Patent: Jun. 17, 2008

(54) SEALING TUBING

(75) Inventors: Peter Ellington, Inverurie (GB); Paul David Metcalfe, Banchory (GB); Iain Cameron MacAulay, Aberdeen (GB); Simon John Harrall, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/555,515

(22) Filed: Nov. 1, 2006

(65) Prior Publication Data

US 2007/0056744 A1 Mar. 15, 2007

Related U.S. Application Data

(62) Division of application No. 10/896,750, filed on Jul. 22, 2004, now abandoned.

(30) Foreign Application Priority Data

Jul. 26, 2003 (GB) ................. 0317547.8

(51) Int. Cl.
*E21B 19/16* (2006.01)
*E21B 43/10* (2006.01)
(52) U.S. Cl. ........................ 166/380; 166/207
(58) Field of Classification Search ............... 166/380, 166/207; 285/223, 84, 86, 294.1–294.3, 285/293
See application file for complete search history.

(56) References Cited

U.S. PATENT DOCUMENTS

| | | | | |
|---|---|---|---|---|
| 2,652,894 A | * | 9/1953 | Brown et al. ............... | 166/134 |
| 2,907,351 A | * | 10/1959 | Rohrback et al. ............. | 285/55 |
| 5,868,437 A | * | 2/1999 | Teague ........................ | 285/45 |
| 6,098,727 A | | 8/2000 | Ringgenberg et al. | |
| 6,425,444 B1 | | 7/2002 | Metcalfe et al. | |
| 6,457,532 B1 | | 10/2002 | Simpson | |
| 6,622,797 B2 | * | 9/2003 | Sivley, IV ................... | 166/380 |
| 2005/0087983 A1 | | 4/2005 | Verger et al. | |

FOREIGN PATENT DOCUMENTS

| | | |
|---|---|---|
| GB | 2 382 607 | 6/2003 |
| RU | 1 367 586 | 11/1996 |
| WO | WO 01/04520 | 1/2001 |
| WO | WO 03/023187 | 3/2003 |
| WO | WO 03/059549 | 7/2003 |
| WO | WO 03/060369 | 7/2003 |
| WO | WO/086675 | 10/2003 |
| WO | WO 2004/009950 | 1/2004 |
| WO | WO 2004/010039 | 1/2004 |

* cited by examiner

*Primary Examiner*—David Bagnell
*Assistant Examiner*—Giovanna C Wright
(74) *Attorney, Agent, or Firm*—Patterson & Sheridan, L.L.P.

(57) ABSTRACT

The invention concerns the sealing of tubing, and in particular the sealing of a joint between expandable tubing sections. In one embodiment, there is disclosed expandable tubing such as an expandable liner comprising at least two expandable tubing sections which are adapted to be coupled together, and a seal adapted to be located around the expandable tubing sections, to seal a joint between the sections.

29 Claims, 10 Drawing Sheets

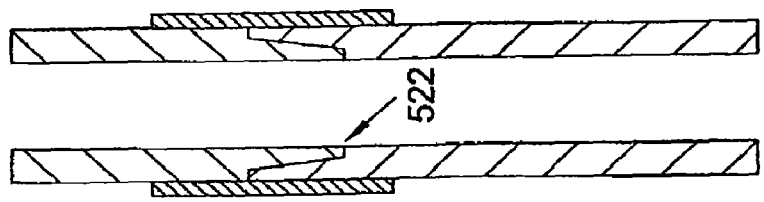
Fig. 12
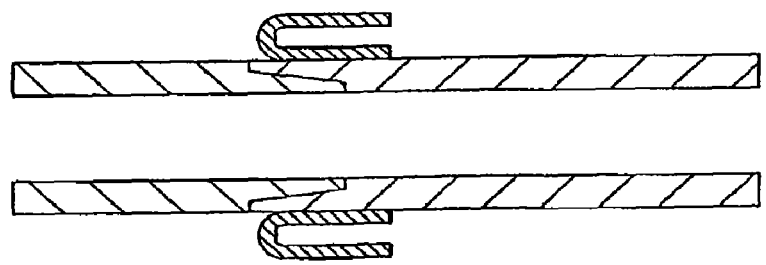
Fig. 11
Fig. 10
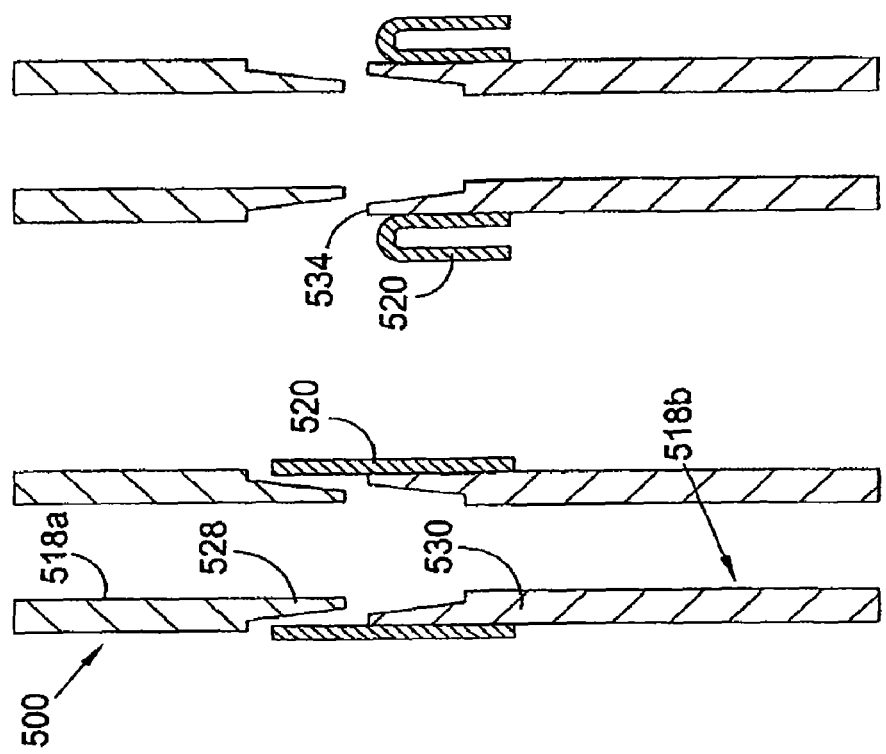
Fig. 9

SEALING TUBING

CROSS-REFERENCE TO RELATED APPLICATIONS

This application is a divisional of U.S. patent application Ser. No. 10/896,750, filed Jul. 22, 2004, now abandoned, which claims benefit of Great Britain patent application Ser. No. 0317547.8, filed Jul. 26, 2003, each application is herein incorporated by reference.

BACKGROUND OF THE INVENTION

1. Field of the Invention

The present invention relates to the sealing of tubing. In particular, but not exclusively, the present invention relates to the sealing of a joint between expandable tubing sections.

2. Description of the Related Art

In the oil and gas exploration and production industry, expandable tubing has been developed and has a variety of uses. These include expandable borehole casing and liner, and expandable sand exclusion based tubing assemblies, such as those disclosed in International patent publication no WO97/17524 (Shell), and as sold under the ESS Trademark by the present applicant.

Expandable tubing offers a number of advantages over conventional borehole tubing, as the expandable tubing can be run into a borehole in an unexpanded state and subsequently expanded downhole. This allows the tubing to be run through existing tubing and then expanded to a larger diameter within the borehole.

The expandable tubing sections typically include a male threaded portion (pin) and a female threaded portion (box) at opposite ends, for joining adjacent sections of tubing together end to end. Maintaining a seal between the pin and box portions post expansion can be problematic.

The sealing of sections of conventional, non-expandable tubing can also be problematic and can involve complex sealing systems.

It is amongst the objects of embodiments of the present invention to obviate or mitigate at least one of the foregoing disadvantages.

SUMMARY OF THE INVENTION

According to a first aspect of the present invention, there is provided expandable tubing comprising:

at least two expandable tubing sections adapted to be coupled together; and a seal adapted to be located around the expandable tubing sections, to seal a joint between the sections.

Preferably, the tubing sections are sections of downhole tubing. It will be understood that the tubing sections are typically located in a bore within a length of existing tubing such as borehole casing or liner, and the seal is compressed between the casing/liner and the tubing sections during tubing expansion, to ensure sealing at the section joints. Alternatively, the tubing sections may be located in open hole.

The expandable tubing sections may include connector portions at opposite ends of each section, for coupling the sections together end to end, to form a string of expandable tubing. The tubing may comprise a connector having first and second portions, each portion adapted to be provided on a respective expandable tubing section. The first and second connector portions may be formed integrally with the respective tubing sections, or may be formed separately and subsequently coupled to the tubing sections. The connector first and second portions may be threaded and may comprise respective threaded male and female portions, such as expandable pin and box portions.

The seal may be adapted to be located overlapping a joint between the tubing sections. In this fashion, the seal acts to prevent fluid ingress and egress at the joint post expansion. Preferably, the seal is deformable and most preferably resilient. The seal may therefore be elastically deformable. The seal may comprise at least one generally tubular member such as a sleeve, ring or collar, the tubular member adapted to be coupled to the tubing sections to seal the joint.

The seal may be adapted to be located around the tubing sections subsequent to coupling of the tubing sections together and prior to expansion of the tubing sections. Alternatively, the seal may be adapted to be located around at least one of the tubing sections prior to coupling of the tubing sections together.

The seal may comprise at least two seal members which may comprise sleeves, each tubing section having at least one seal member coupled thereto. The seal may include a first seal member adapted to be coupled to one tubing section and a second seal member adapted to be coupled to an adjacent tubing section, the first and second seal members adapted to be brought into abutment to together form a seal, either when the tubing sections are coupled together or in a separate procedure following coupling of the tubing sections, for example, by translation of one or both of the seal members along the tubing sections. To ensure adequate sealing post-expansion, the first and second seal members may be adapted to be located overlapping respective axial end portions of the tubing sections, such that when the tubing sections are coupled together, ends of the seal members are pressed together and compressed. Thus when coupled together, a mating force may be exerted on the seal members to seal the joint. It will be understood that when the tubing sections are expanded and compressed between a wall of a borehole in which the expandable tubing is located and the expandable tubing sections, the seal members are elongated, enhancing sealing at the interface between the members.

Alternatively, the seal may be adapted to be mounted on one of the tubing sections and, following coupling, translated along the tubing sections to a location where the seal seals the joint, and may be located straddling the joint.

In a further alternative, the seal may be adapted to be located extending beyond an end of one of the tubing sections prior to coupling the sections together, and may be adapted to receive the other tubing section, whereby on coupling the tubing sections, the joint is sealed.

Alternatively, the seal may be moveable from a first, non-sealing configuration to a second, sealing configuration following coupling of the tubing sections together, and may be adapted to be located on said tubing section in a folded, non-sealing configuration. In an alternative, the seal may be adapted to be located in a first configuration extending beyond an end of one of the tubing sections and then moved to a second, non-sealing configuration to expose said end, for coupling the tubing sections together. The seal may then be adapted to be returned to the first configuration to seal the joint. The seal may be deformable and is preferably elastically deformable.

In a further alternative embodiment, the seal members may be adapted to be located spaced from one another and may be spaced axially along the tubing sections. The seal members may be adapted to be brought into abutment during expansion of the tubing sections. Alternatively, the seal members may provide an adequate seal without being brought into abutment, and may therefore remain axially spaced post expansion. The seal may thus be established through an interaction between the tubing sections, the seal members and the wall of the borehole or tubular in which the tubing sections are located.

The seal may comprise an elastomeric material or a rubber material. The seal may be adapted to swell in the presence of water and/or hydrocarbons and may comprise a swelling elastomer or a natural rubber. This provides enhanced seal performance over time as the seal absorbs water/hydrocarbons in the downhole environment and swells. The seal may be coupled to the expandable tubing sections by an adhesive, or may be thermally bonded (for example, welded or fused) to the tubing sections. An outer surface of one or more tubing section may be textured or roughened to improve grip with the seal. Alternatively, the seal may comprise a metal or metal alloy having a relatively low yield strength and modulus of elasticity, such as bronze or lead. The seal may therefore provide a metal to metal seal. In a further alternative, the tubing may include a recess, slot, groove, channel or the like in which at least part of the seal is located.

The tubing may comprise a plurality of seals.

The seal may comprise at least two seal portions which may be of materials having different material properties. For example, one of the seal portions may be of a material having a higher yield strength and/or modulus of elasticity (Young's Modulus) than the other seal portion. One of the seal portions may be of a metal such as a steel or other alloy, and the other portion may be of an elastomeric or rubber material, or a metal or alloy having a relatively low yield strength and/or modulus. The seal may comprise an inner seal member and an outer seal member adapted to be located around the inner seal member and the outer seal member may comprise a sleeve, ring or collar and may extend over part or all of an unexpanded length of the inner seal member. In this fashion, when the tubing is expanded, the inner seal member is at least partly compressed between the tubing sections and the outer seal member. This is of particular use where a surrounding borehole casing or liner has deteriorated such that an inner wall of the casing has become uneven, for example, through corrosion. In these circumstances, a seal without such an outer seal member may not be compressed sufficiently to adequately seal the section joint. The outer seal member, however, provides a consistent internal surface to compress the inner seal member on expansion. This is of further use where the tubing is to be located in an open hole, where the borehole wall is typically uneven.

The outer seal member may carry the inner seal member and may include a recess such as a groove, slot, channel or the like in which the inner seal member is mounted. The outer seal member may carry a plurality of inner seal members and may include a seal member adapted to be located either side of the joint between the tubing sections.

Alternatively, the tubing may further comprise at least one restraining or fixing member adapted to restrain the seal against axial movement in at least one axial direction. The restraining member may be coupled to or mounted on one of the tubing sections and may be adapted to receive the seal. The restraining member may restrain the seal against axial movement during expansion of the tubing, by translation of an expansion tool through the tubing. This may also protect the seal from damage and/or movement during run-in of the tubing into a borehole. The restraining member and the seal may take the form of the outer and inner seal members, respectively, defined above.

In a further alternative, the tubing may further comprise at least one support or reinforcing member, the support member adapted to support the seal by providing a clamping force to securely clamp the seal pre and/or post expansion to the tubing and/or to resist axial movement of the seal. The support member may be provided integrally with the seal member and may, for example, be embedded or mounted in the seal. Alternatively, the support member may be provided externally of the seal, for example, mounted on or around a radially outer surface of the seal. The support member may comprise a sleeve, ring or the like; a plurality of sleeves/rings; or a wire or cable. The seal and support member may take the form of the inner and outer seal members, respectively, defined above.

In a further alternative, the seal may comprise a plurality of seal members or portions of different material properties. For example, the seal may comprise at least one metal seal member, for metal to metal sealing, and at least one elastomeric or rubber seal member. The seal members may be adapted to cooperate with a corresponding seal member carried by a tubing section.

The seal members may be spaced axially along the seal sleeve and/or the tubing such that when the seal is coupled to the tubing sections, a plurality of seals may be defined, adjacent seals optionally having different material properties.

According to a second aspect of the present invention, there is provided a string of expandable tubing comprising:

a plurality of expandable tubing sections coupled together; and a plurality of seals located around a selected at least one of the joints between the tubing sections.

Further features of the tubing sections and the seals are defined above.

According to a third aspect of the present invention, there is provided a connector for expandable tubing sections, the connector comprising:

first and second portions each adapted to be provided on a respective expandable tubing section, the first and second portions adapted to be coupled together; and a seal adapted to be located around the first and second portions to seal a joint between the portions.

It will be understood that the seal functions to seal the joint between the first and second portions of the connector in the same fashion as the joint between the expandable tubing sections, as described above. Further features of the connector and the seal are defined above.

According to a fourth aspect of the present invention, there is provided a seal for expandable tubing sections, the seal adapted to be located around adjacent expandable tubing sections to seal a joint between the sections.

According to a fifth aspect of the present invention, there is provided a method of sealing a joint between expandable tubing sections, the method comprising the steps of:

coupling expandable tubing sections together; and locating a seal around the expandable tubing sections.

The method may comprise coupling the tubing sections together and then locating the seal around the tubing sections. The seal may be located overlapping the joint between the tubing sections, and may straddle the joint. In one embodiment, the seal may be mounted on one of the tubing sections and then translated to a location sealing the joint, where the seal may straddle the joint.

Alternatively, the method may comprise coupling a seal member to each one of the tubing sections and subsequently coupling the tubing sections together, to compress the seal members. The method may comprise locating the seal members overlapping axial end portions of the tubing sections. As described above, this may enhance sealing of the joint.

The method may comprise locating a seal comprising an inner seal member around the tubing sections and an outer seal member, of a material having a higher yield strength and modulus of elasticity than the inner seal member, around the inner seal member. The outer seal member may be located around the inner seal member subsequent to coupling the tubing sections together, or the inner and outer seal members may be provided as a seal unit to be located around the tubing sections together.

In a further alternative, the seal may be located with a portion extending beyond an end of one of the tubing sections prior to coupling the sections together and the other tubing section may then be located in said portion and coupled to said tubing section.

In a still further alternative, the seal may be mounted on one of the tubing sections in a first configuration and then deformed or otherwise moved to a second, non-sealing configuration, by deforming the seal (such as by folding the seal back). The tubing sections may then be coupled together and the seal subsequently returned to the first configuration, to seal the tubing sections. Alternatively, the seal may be mounted on said tubing section in a first, non-sealing configuration and subsequently moved to a second, sealing configuration.

The method may comprise restraining the seal against axial movement in at least one direction, for example, by coupling a restraining member to a tubing section and locating the seal in or coupling the seal to the restraining member.

The method may comprise clamping the seal to a tubing section using a support or reinforcing member.

The step of locating the seal around the expandable tubing sections may provide at least an initial seal of the joint between the sections. Additionally or alternatively, the method may further comprise expanding the tubing sections to compress the seal and seal the joint.

According to a fifth aspect of the present invention, there is provided a method of locating an expandable tubing in a borehole, the method comprising the steps of:

coupling a plurality of expandable tubing sections together;

locating a seal around a selected at least one joint between adjacent tubing sections;

locating the expandable tubing in the borehole; and expanding at least part of the expandable tubing, compressing the at least one seal between the borehole and the expandable tubing.

It will be understood that the tubing is typically located in tubing casing, liner, expandable sand exclusion based tubing assemblies, or other tubing previously installed in the borehole or in an open hole environment.

According to a sixth aspect of the present invention, there is provided tubing comprising:

at least two tubing sections adapted to be coupled together; and a seal adapted to be located around the tubing sections, to seal a joint between the sections.

According to a seventh aspect of the present invention, there is provided a method of sealing a joint between tubing sections, the method comprising the steps of:

coupling tubing sections together; and locating a seal around the tubing sections.

BRIEF DESCRIPTION OF THE DRAWINGS

Embodiments of the present invention will now be described, by way of example only, with reference to the accompanying drawings, in which:

FIG. 9 is a longitudinal sectional view of expandable tubing in accordance with a yet further alternative embodiment of the present invention, shown prior to coupling expandable tubing sections of the tubing together and prior to expansion of the tubing;

FIGS. 10-12 are views illustrating steps in a method of coupling the expandable tubing sections of FIG. 9 together;

DETAILED DESCRIPTION OF DRAWINGS

Figure 1:
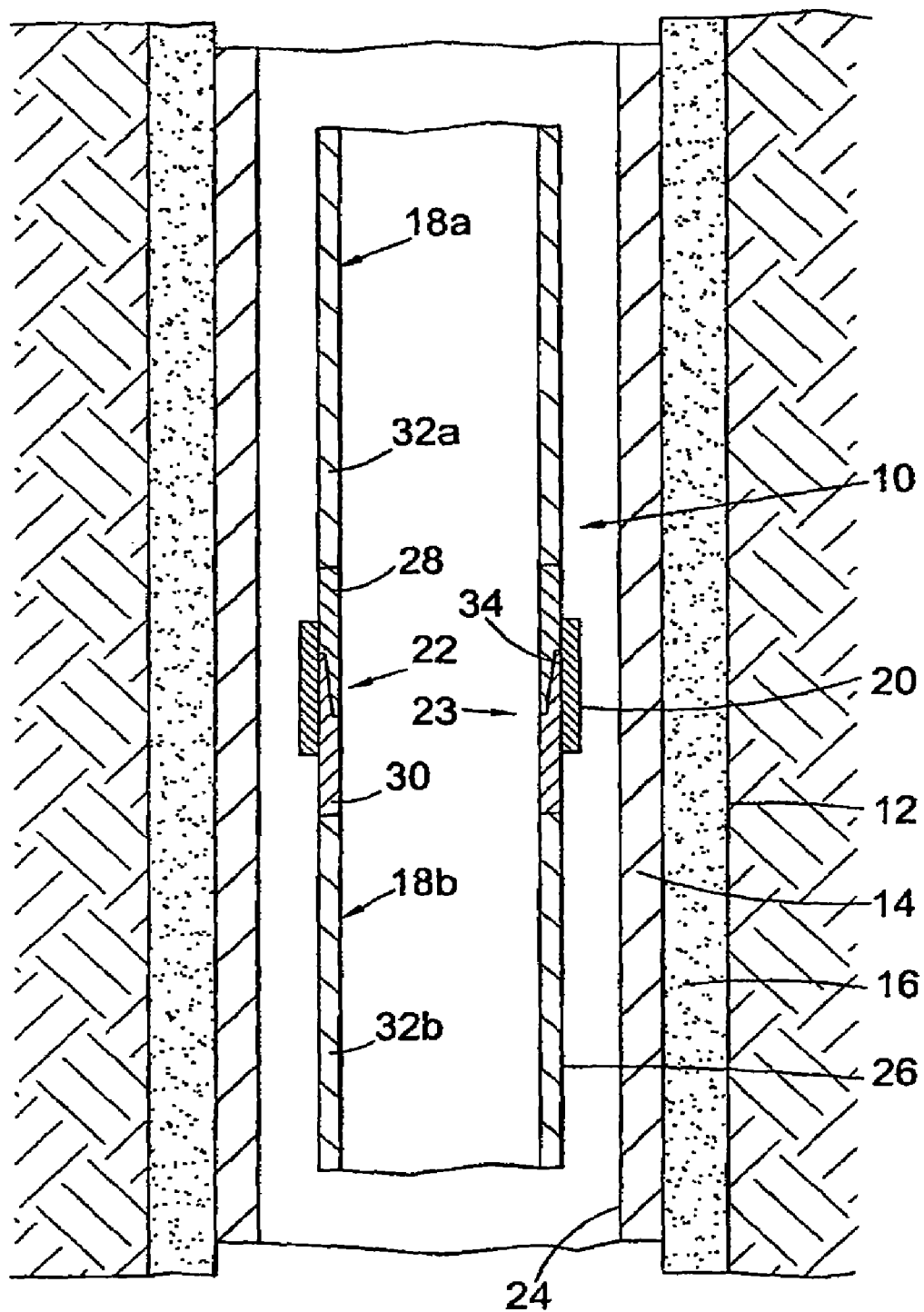
FIG. 1 is a longitudinal sectional view of expandable tubing in accordance with an embodiment of the present invention, shown located in a casing lined borehole prior to expansion of the tubing.

Turning firstly to FIG. 1, there is shown a longitudinal sectional view of expandable tubing in accordance with an embodiment of the present invention, the tubing indicated generally by reference numeral 10. The tubing 10 is shown located in a borehole 12 which has previously been lined with a casing 14, and cemented at 16, in a conventional fashion. The tubing 10 is shown in FIG. 1 prior to expansion of the tubing into contact with the borehole casing 14.

In general terms, the expandable tubing 10 comprises expandable tubing sections 18a, 18b coupled together to form the tubing 10, and a seal 20 located around the expandable tubing sections 18a, 18b, to seal a joint 22 between the tubing sections.

Figure 2:
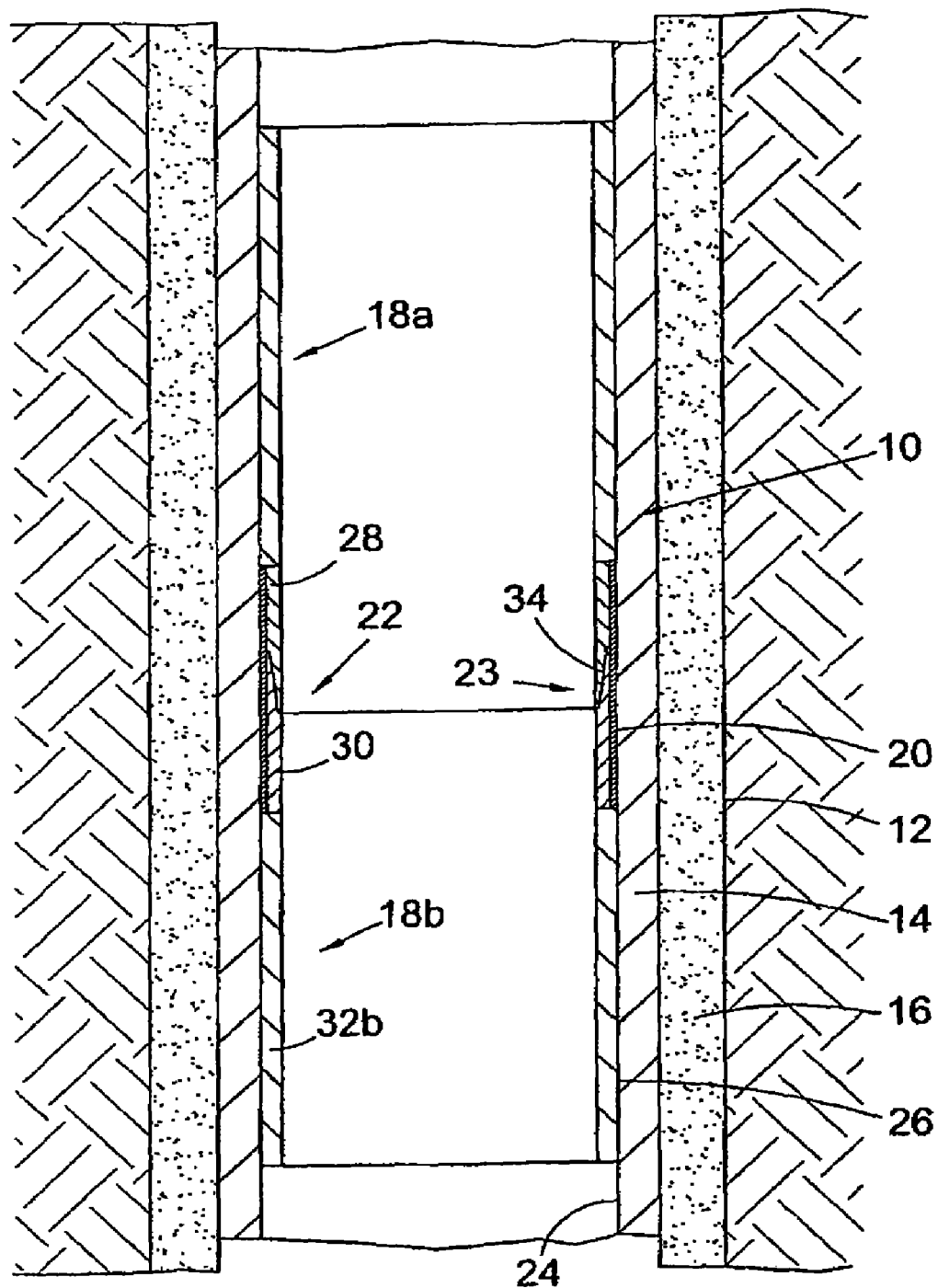
FIG. 2 is a view of the tubing of FIG. 1 after expansion.

The expandable tubing 10 which, in this embodiment, comprises a solid expandable liner for gaining access to a hydrocarbon bearing formation below the casing 14, is first located in the borehole casing 14 as shown in FIG. 1. The liner tubing 10 is then expanded as shown in FIG. 2, to bring the seal 20 into contact with an inner wall 24 of the casing 14. The seal 20 is thus compressed between the inner wall 24 of the casing 14 and an outer surface 26 of the tubing 10, to seal the joint 22. This compression causes elongation of the seal 20.

In more detail, the expandable tubing 10 typically comprises a large number of expandable tubing sections coupled together to form an expandable tubing string, which may extend for hundreds or thousands of feet along a length of the borehole 12. However, only two such sections 18a, 18b are shown in the Figures.

Each tubing section 18a, 18b carries a male threaded portion 28, forming a pin, and a female threaded portion 30, forming a box, at opposite ends thereof. Adjacent sections of expandable tubing are coupled together by threading the pin of one section into the box of an adjacent section, as shown in FIG. 1. The pin 28 of one section and the box 30 of the adjacent section together form a connector 23. Both the pin 28 and box 30 are provided as short subs welded to the end of respective solid expandable tubes 32a, 32b, forming main parts of the tubing sections, and the pin 28 and box 30 are expandable.

The seal 20 comprises a short sleeve, of an elastomeric, rubber or metal of relatively low yield strength and modulus of elasticity, such as bronze or lead. The seal 20 is located around the joint 22 between the tubing sections 18a, 18b at surface following their coupling together and prior to running the expandable tubing 10 into the casing 14. This is achieved by first locating the seal 20 around the box 30 of the tubing section 18b at a level below an end 34 of the box, and then threading the pin 28 of the tubing section 18a into the box 30, in a conventional fashion. The seal 20 is then moved upwardly to overlap the joint 22, sealing the joint, and is fixed to the tubing sections using an adhesive, or by welding or fusing. It will be understood that this procedure may be reversed and that the seal may be initially located around the pin 28. Each joint between adjacent tubing sections forming the expandable tubing 10 may be sealed in this fashion using seals 20, or only selected ones of the joints may be sealed.

The completed tubing 10 is then run into the casing 14, as shown in FIG. 1, and is located relative to the casing 14 by any appropriate means. For example, the tubing 10 may be suspended from the casing 14 by a liner hanger. Alternatively, the tubing 10 is temporarily suspended from surface until such time as the tubing 10 has been expanded. An expansion tool, such as an expansion cone or mandrel, or a rotary tubing expansion tool such as that disclosed in the Applicant's International patent publication no WO00/37766 (or a combination thereof), is then passed through the tubing 10, to radially expand the tubing. FIG. 2 illustrates the tubing after expansion, where the tubing sections 18a, 18b have been radially expanded into contact with the casing inner wall 24. The connector 23 has also been expanded radially outwardly, compressing the seal 20 between the borehole inner wall 24 and the tubing outer surface 26. It will be understood that the seal 20 is illustrated in an exaggerated fashion in FIG. 2, which may not represent the true appearance of the seal following expansion of the tubing 10.

The seal 20 is thus held under compression to seal the joint 22, preventing fluid ingress from within or surrounding the casing 14 into the tubing 10, or egress from the tubing 10 through the joint 22, as may otherwise occur due to deformation of the pin 28 and box 30 during the expansion process.

Figure 3:
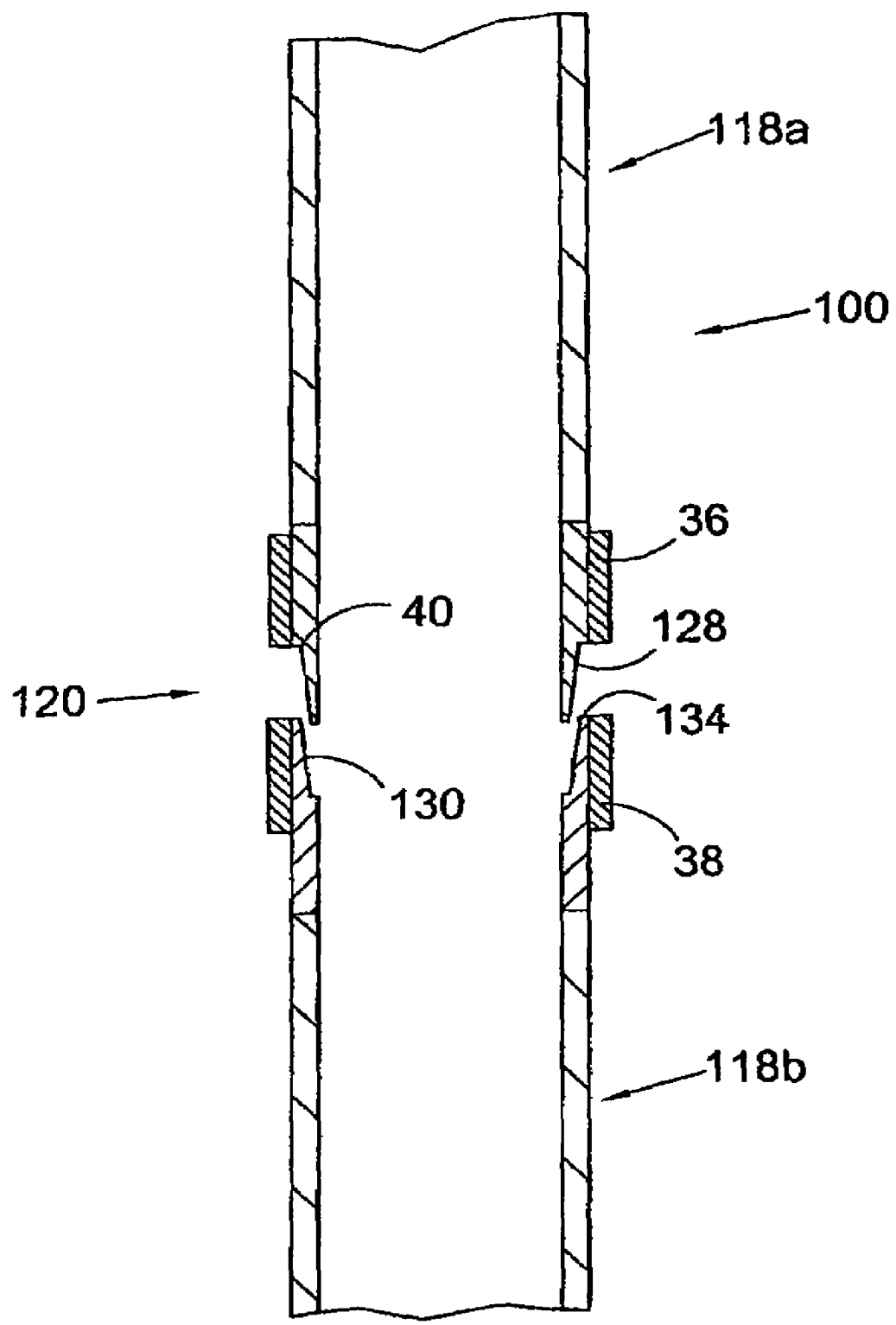
FIG. 3 is longitudinal sectional view of expandable tubing sections shown before being coupled together to form expandable tubing in accordance with an alternative embodiment of the present invention.

Turning now to FIG. 3, there is shown an expandable tubing in accordance with an alternative embodiment of the present invention, the tubing indicated generally by reference numeral 100. Like components of the tubing 100 with the tubing 10 of FIGS. 1 and 2 share the same reference numerals, incremented by 100. Only the main differences between the tubing 100 and the tubing 10 will be described in detail.

Figure 4:
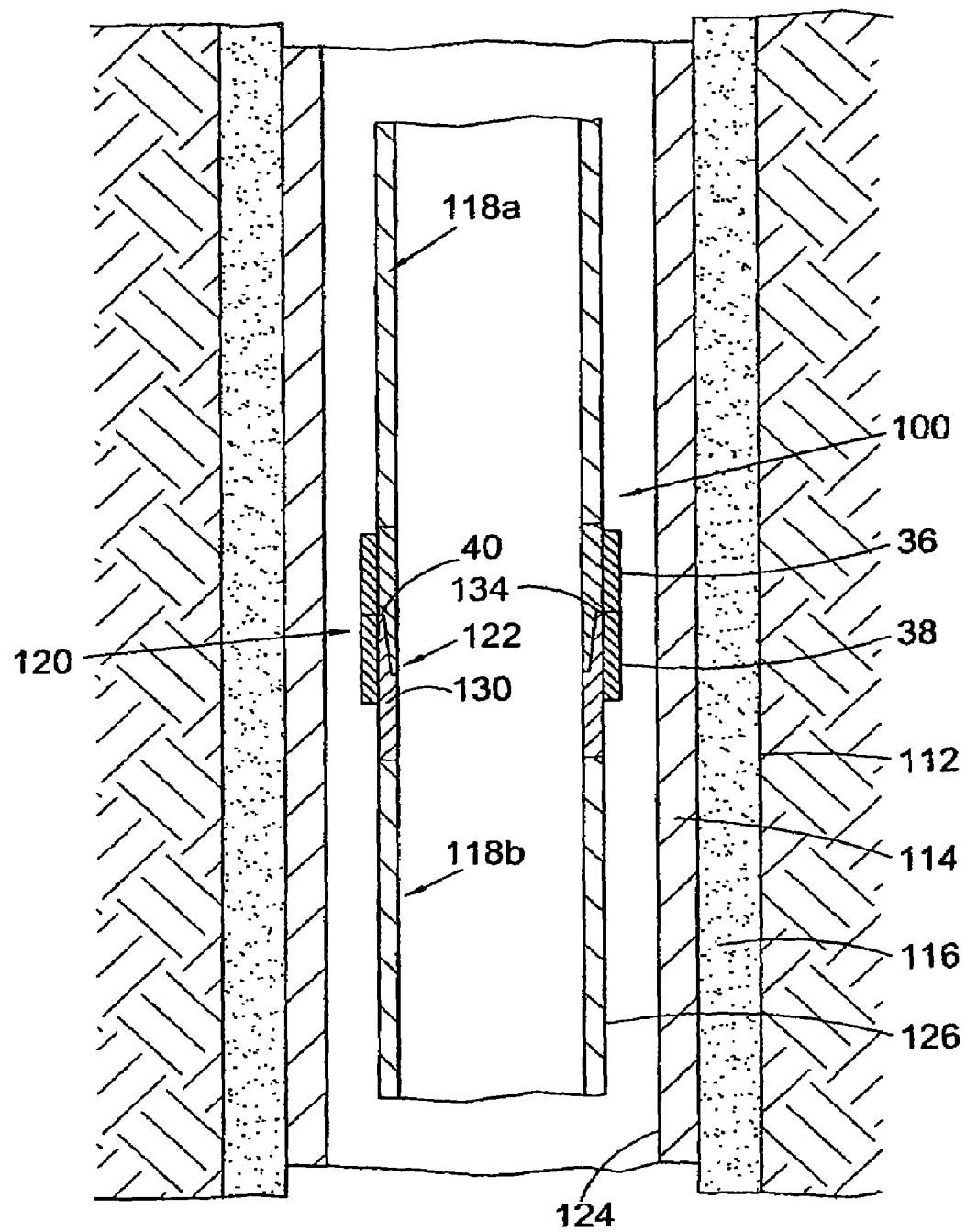
FIG. 4 is a view of the expandable tubing sections of FIG. 3 coupled together to form the expandable tubing, shown located in a casing lined borehole but prior to expansion of the tubing.

The tubing 100 comprises an expandable solid liner, and the seal 120 comprises two seal portions in the form of first and second seal members 36, 38, which are sleeves of a similar material to the seal 20 described above. However, the first sleeve 36 is carried by the pin 128 on tubing section 118a, whilst the second sleeve 38 is carried by the box 130 on tubing section 118b. When the tubing sections 118a, 118b are coupled together as shown in FIG. 4, the first and second sleeves 36, 38 are brought into abutment. The sleeves 36, 38 may be located overlapping end portions of the respective tubing sections. Specifically, the sleeve 36 may be located overlapping a shoulder 40 on the pin 128, and the second sleeve 38 overlapping the end 134 of the box 130. When the seal sleeves 36, 38 are brought into abutment, there is an initial compression of the sleeves to provide a mating force which improves sealing of the joint 122.

As shown in FIG. 4, the string of expandable tubing 100 is located in a borehole casing 114 in a similar fashion to the tubing 10, and is then expanded. Compression of the seal 120 results in an enhanced sealing effect on the joint 122, as the seal sleeves 36, 38 elongate along the length of the tubing 100 in the same way as the seal 22 illustrated in FIG. 2, enhancing the mating force between the sleeves.

Figure 5:
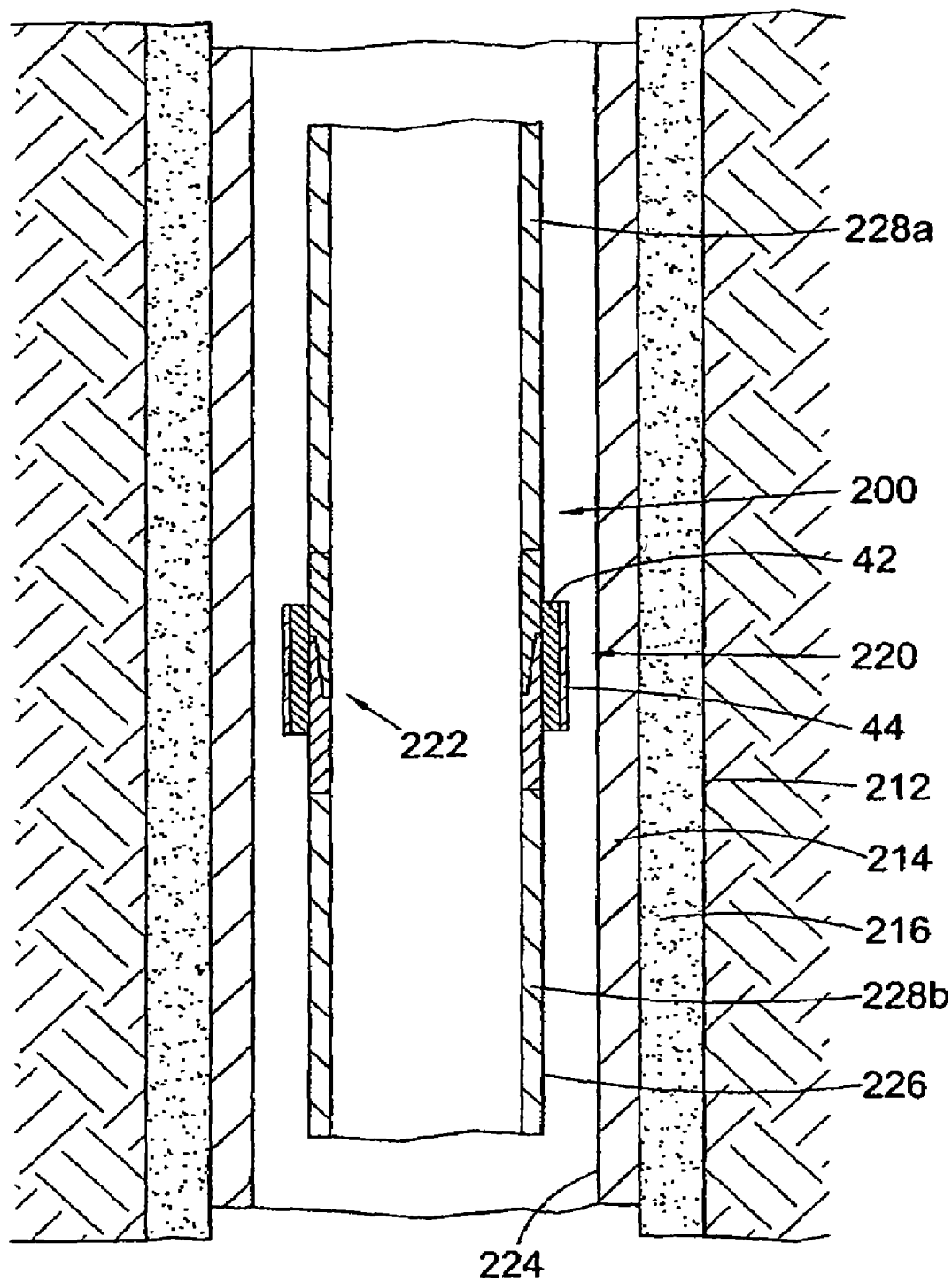
FIG. 5 is a longitudinal sectional view of expandable tubing in accordance with a further alternative embodiment of the present invention, shown located in a casing lined borehole prior to expansion of the tubing.

Turning now to FIG. 5, there is shown a longitudinal sectional view of an expandable tubing 200 in accordance with a further alternative embodiment of the present invention, indicated generally by reference numeral 200. The tubing 200 is similar to the tubing 10 of FIGS. 1 and 2, and like components share the same reference numerals incremented by 200.

The tubing 200 differs from the tubing 10 in that the seal 220 of the tubing 200 comprises two seal portions in the form of an inner seal member 42 and an outer seal member 44. The inner seal member 42 is an elastomeric, rubber or metal seal sleeve, and the outer seal member 44 is a seal sleeve 44 of a material having a higher yield strength and/or modulus of elasticity than the inner seal sleeve 42, typically of a metal such as a steel. The outer seal sleeve 44 is located around the inner seal sleeve 42 following connection of the tubing sections 228a, 228b together and location of the inner sleeve 42 around the joint 222. Alternatively, the seal 220 may be provided as a single unit.

When the tubing 200 is expanded, the inner seal sleeve 42 is compressed between the outer seal sleeve 44 and the outer surface 226 of the tubing 200, to seal a joint 222 between sections 228a, 228b of the tubing. This ensures adequate sealing of the joint 222 in a deteriorated casing 214, where the inner wall 224 of the casing 214 has suffered from corrosion and has become pitted. This typically results in the internal bore of the casing 214 being of an inconsistent internal diameter. In these circumstances, a seal of the type illustrated in FIG. 1 may not be sufficient to ensure adequate sealing of the joint, as the seal 20 may not be sufficiently compressed following expansion. This problem is obviated by use of the tubing 200.

Figure 6:
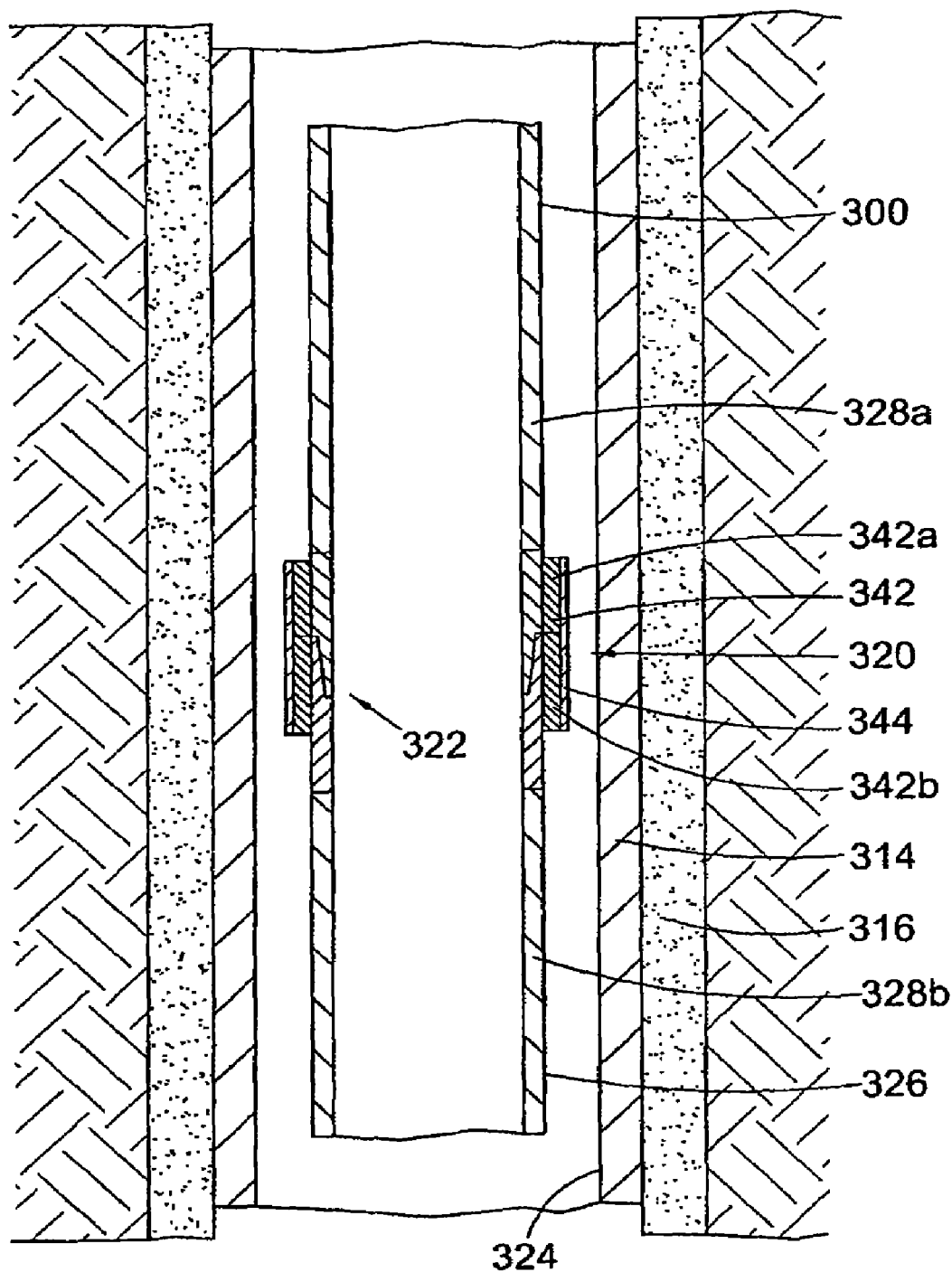
FIG. 6 is a longitudinal sectional view of expandable tubing in accordance with a still further alternative embodiment of the present invention, shown located in a casing lined borehole prior to expansion of the tubing.

FIG. 6 is a longitudinal sectional view of expandable tubing in accordance with a further alternative embodiment of the present invention, the tubing indicated generally by reference numeral 300. The tubing 300 comprises elastomeric inner seal sleeves 342a, 342b and a metal outer seal sleeve 344. The outer seal sleeve 344 is located around the inner seal sleeves 342a, 342b following connection of tubing sections 328a, 328b together. The tubing 300 is expanded in a similar fashion to the tubing 200 of FIG. 5, and allows adequate sealing of a joint 322 between the expandable tubing sections 328a, 328b, even in a deteriorated casing.

Figure 7:
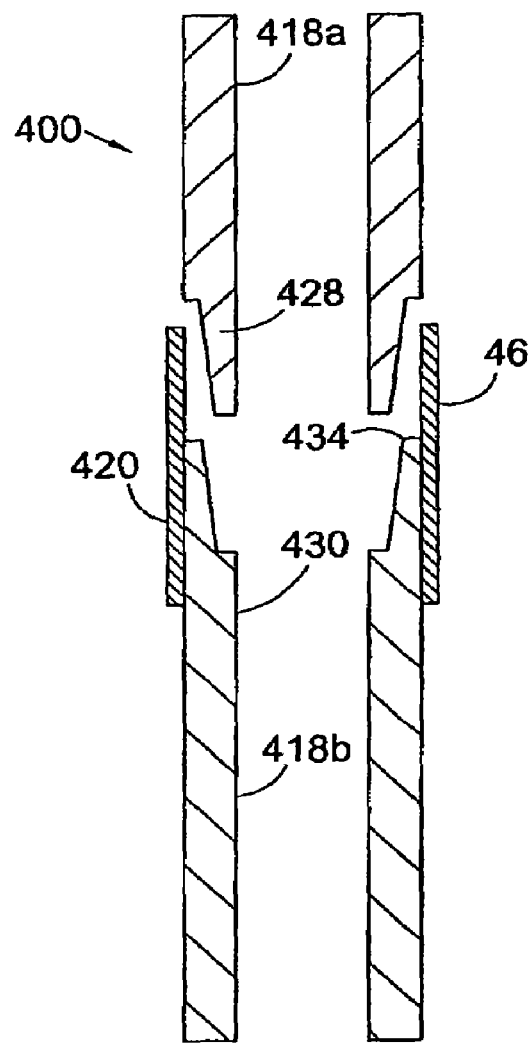
FIG. 7 is a longitudinal sectional view of expandable tubing in accordance with a yet further alternative embodiment of the present invention, shown prior to coupling expandable tubing sections of the tubing together and prior to expansion of the tubing.

Turning now to FIG. 7, there is shown expandable tubing in accordance with a yet further alternative embodiment of the present invention, indicated generally by reference numeral 400 and shown in FIG. 7 prior to connection of expandable tubing sections 418a, 418b together. It will be noted that like components of the tubing 400 with the tubing 10 of FIGS. 1 and 2 share the same reference numerals, incremented by 400.

The tubing 400 includes a seal 420 located on a box 430 of the tubing section 418b with a portion 46 of the seal 420 overlapping and extending beyond an end 434 of the box 430. The pin 428 is mated with the box 430 by locating the pin 428 in the portion 46 of the seal 420, before lowering the pin 428 and connecting the pin to the box 430. The seal 420 is thus located prior to connection of the tubing sections 418a, 418b, and seals the joint 422 between the tubing sections following connection.

Turning now to FIG. 9, there is shown a longitudinal sectional view of expandable tubing in accordance with a yet further alternative embodiment of the present invention, the expandable tubing indicated generally by reference numeral 500. Like components of the tubing 500 with the tubing 10 of FIGS. 1 and 2 share the same reference numerals, incremented by 500.

Figure 8:
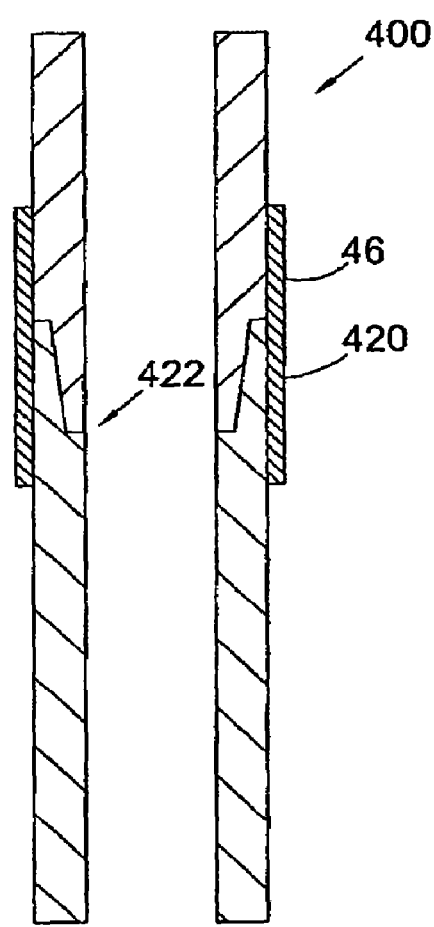
FIG. 8 is a view of the expandable tubing sections of FIG. 7 following coupling of the expandable tubing sections together.

In a similar fashion to the tubing 400 of FIGS. 7 and 8, the expandable tubing 500 includes a seal 520 which is located on a box 530 of a tubing section 518b prior to connecting with a pin 528 of an expandable tubing section 518a.

The seal 520 is located on the box 530 in a first configuration shown in FIG. 9. However, the seal 520 is elastically deformable and is folded or peeled back away from an end 534 of the box to a second, non-sealing position exposing the box end 534. The pin 528 is then lowered and connected to the box 530, as shown in FIG. 11, and the seal 520 is subsequently returned to the first position, thereby sealing a joint 522 between the expandable tubing sections 518a, 518b, as shown in FIG. 12.

Figure 13:
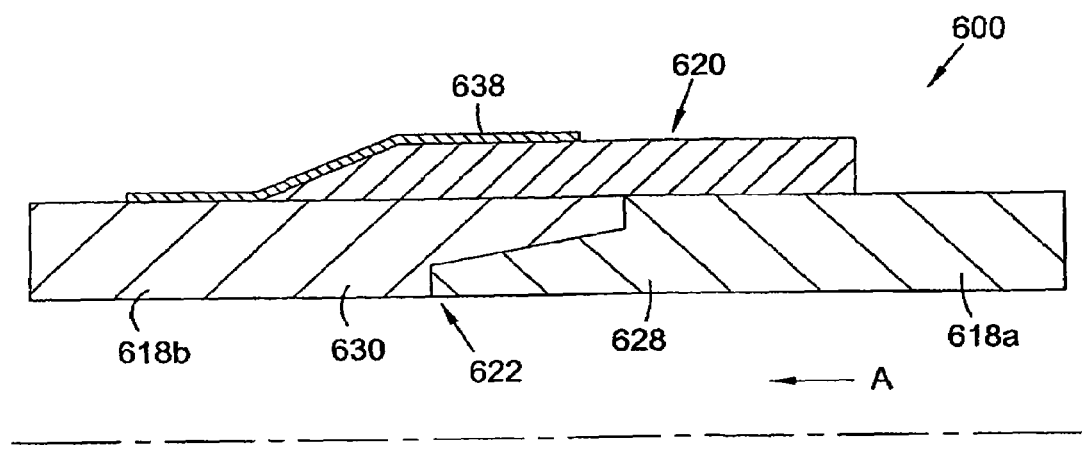
FIG. 13 is a longitudinal half-sectional view of expandable tubing in accordance with a yet further alternative embodiment of the present invention.

Turning now to FIG. 13, there is shown a longitudinal half-sectional view of expandable tubing in accordance with a yet further alternative embodiment of the present invention, the expandable tubing indicated generally by reference numeral 600. Like components of the expandable tubing 600 with the expandable tubing 10 of FIGS. 1 and 2 share the same reference numerals, incremented by 600.

The expandable tubing 600 includes a seal 620 of an elastomeric or other material, similar to the seal 20 of the expandable tubing 10. A restraining member 638 in the form of a sleeve of a material having a higher yield strength and/or Young's Modulus than the seal 620 is mounted on a box 630 of an expandable tubing section 618b, and is shaped to receive the seal 620. The sleeve 638 restrains the seal 620 against axial movement during expansion of the tubing 600, for example, by passing an expansion tool through the tubing 600 in the direction of the arrow A, and thus supports the seal 620.

Also, the sleeve 638 is tapered and thereby prevents damage to the seal 620 when the tubing 600 is run into a borehole.

It will be understood that the principles behind construction of the tubing 600 may be applied to any one of the expandable tubings 10, 100, 200, 300, 400 or 500 described above. In particular, the sleeve 638 may extend along a majority of a length of the seal 620, affording the advantages described above in relation to the expandable tubing 200 or 300.

Figure 14:
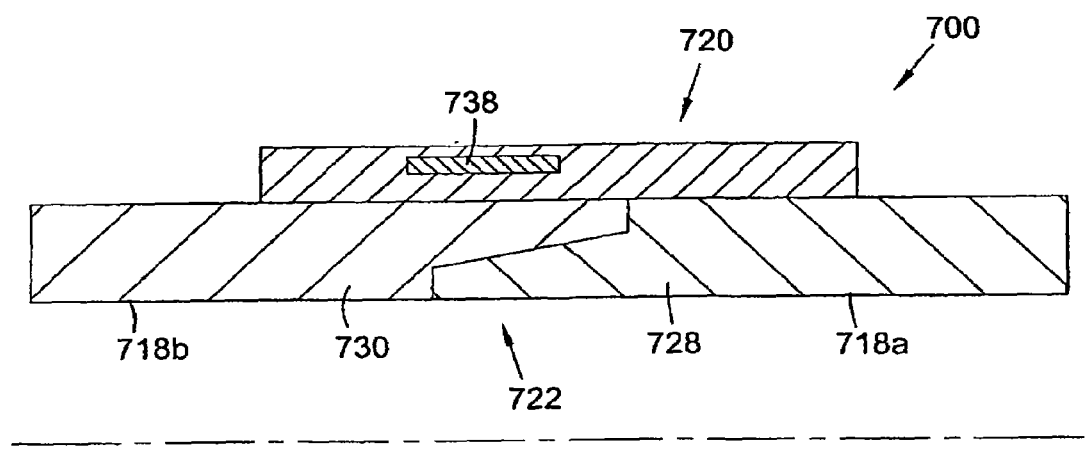
FIG. 14 is a longitudinal half-sectional view of expandable tubing in accordance with a yet further alternative embodiment of the present invention.

Turning now to FIG. 14, there is shown a longitudinal half-section view of expandable tubing in accordance with a yet further alternative embodiment of the present invention, the expandable tubing indicated generally by reference numeral 700. Like components of the tubing 700 with the tubing 10 of FIGS. 1 and 2 share the same reference numerals incremented by 700.

The tubing 700 includes a seal 720, typically of an elastomeric material and a support or reinforcing member 738 in the form of a sleeve of a higher yield strength and/or Young's Modulus than the seal 720.

The sleeve 738 is formed integrally with the elastomeric seal 736, but may equally be mounted on an outer surface or otherwise coupled to the seal 736. The sleeve 738 exerts a clamping force on the seal 720, to assist in maintaining the seal 720 in a position sealing a joint 722 between expandable tubing sections 718a, 718b of the tubing 700 both during run-in to a borehole and following expansion.

Figure 15:
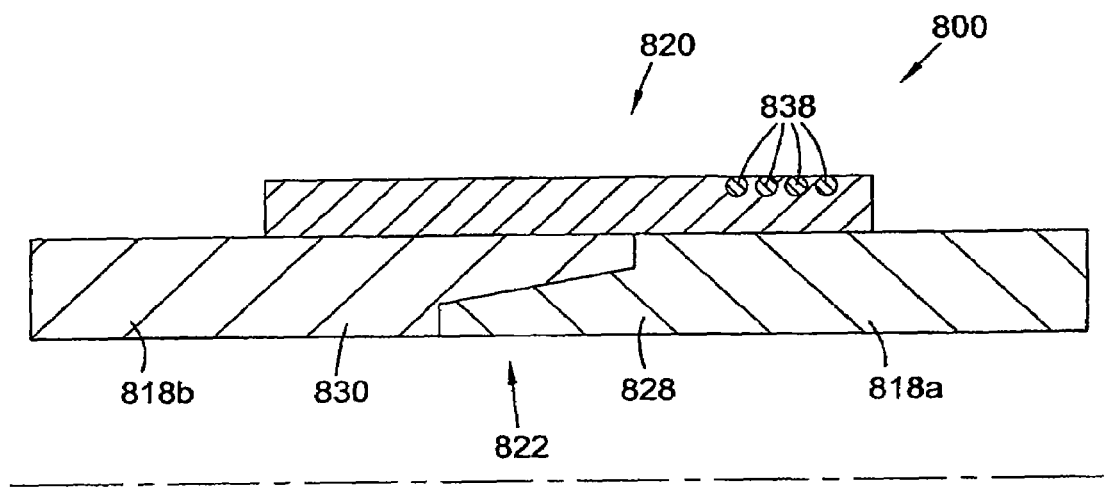
FIG. 15 is a longitudinal half-sectional view of expandable tubing in accordance with a yet further alternative embodiment of the present invention.

Turning now to FIG. 15, there is shown a longitudinal half-sectional view of expandable tubing in accordance with a yet further alternative embodiment of the present invention, the expandable tubing indicated generally by reference numeral 800. Like components of the expandable tubing 800 with the expandable tubing 10 of FIGS. 1 and 2 share the same reference numerals, incremented by 800.

The expandable tubing 800 is essentially similar to the expandable tubing 700 of FIG. 14, except the tubing 800 includes a seal 820 and a support or reinforcing member in the form of a number of wires or cables 838 formed integrally with, or mounted on or around the seal 820, to provide a clamping force.

Where the wires 838 (or indeed the sleeve 738 of tubing 700) is located around the seal 820, or for example in a groove in the seal, the tubing sections 818a, 818b may be coupled together and sealed using one of the structures and according to one of the methods described above. The wires may then subsequently be located around the seal 820, to provide a clamping force. This facilitates mounting of the seal 820 on the tubing by only creating the clamping force after coupling and sealing of the tubing sections 818a, 818b.

Figure 16:
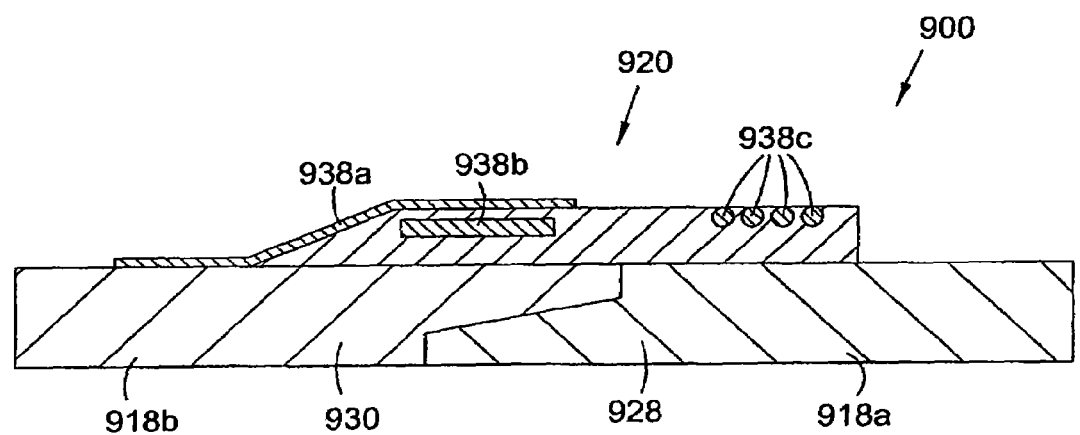
FIG. 16 is a longitudinal half-sectional view of expandable tubing in accordance with a yet further alternative embodiment of the present invention.

Turning now to FIG. 16, there is shown a longitudinal half-sectional view of expandable tubing in accordance with a yet further alternative embodiment of the present invention, the expandable tubing indicated generally by reference numeral 900. Like components of the expandable tubing 900 with the expandable tubing 10 of FIGS. 1 and 2 share the same reference numerals, incremented by 900.

The expandable tubing 900 essentially combines the features of the expandable tubing 600, 700 and 800 of FIGS. 13, 14 and 15. Thus the tubing 900 includes a seal 920 with a restraining sleeve 938a, a sleeve 938b which exerts a clamping force on the seal 920, and reinforcing wires 938c, thereby combining each of the advantages discussed above.

In particular, the sleeve 938b may exert a relatively greater clamping force than the wires 938c, facilitating connection of the expandable tubing sections 918a, 918b. For example, the sleeve 938b may be provided integrally with the seal 920, and the wires 938c mounted around the seal 920 following connection of the tubing sections 918a, 918b. This facilitates connection of the tubing sections 918a, 918b in that the clamping force exerted by the wires 938c is only exerted subsequent to coupling of the tubing sections.

It will be understood that, in further alternative embodiments, a seal may be provided incorporating two sleeves, which may take the form of the sleeve 738 of tubing 700, the sleeves spaced either side of the joint 722, or indeed wires such as the wires 838 of tubing 800 may be provided on both sides of the joint 822. In a further alternative, the configuration of the sleeve 938b and wires 938c in the tubing 900 of FIG. 16 may be reversed, such that the wires 938c are provided around the portion of the seal 920 on the box 930. Also, the sleeve/wire may overlap the respective joint.

Furthermore, any one of the seals may be angled (tapered) in the fashion of the seals 620, 920 of the tubing 600 or 900.

It will be understood that the principles of any of the tubings 700, 800 or 900 may equally be employed with the tubings 10, 100, 200, 300, 400 or 500 described above.

Various modifications may be made to the foregoing with the scope of the present invention.

For example, the tubing may comprise slotted or otherwise perforated tubing, and may comprise an expandable sand exclusion tubing based assembly, such as the Applicant's ESS (Trademark). The tubing may be used in an open hole environment. The tubing sections may be coupled together in any suitable fashion, such as by stab, snap fit or latch lock connections. The seal and the inner seal members may swell in the presence of water and/or hydrocarbons, such as borehole fluids (oils and gasses) and may comprise a swelling elastomer.

The outer seal member may carry the inner seal member and may include a recess such as a groove, slot, channel or the like in which the inner seal member is mounted. The outer seal member may carry a plurality of inner seal members and may be adapted to provide a seal member spaced either side of the joint between the tubing sections.

In a further alternative, the seal may comprise a plurality of seal members or portions of different material properties. For example, the seal may comprise at least one metal seal member, for metal to metal sealing, and at least one elastomeric or rubber seal member. The seal members may be adapted to cooperate with a corresponding seal member carried by a tubing section. The seal member may comprise an outer seal sleeve including at least one seal member extending inwardly of the seal sleeve and with at least one separate seal member of a different material mounted on the seal sleeve or a tubing section. The seal members may be of an elastomeric, rubber or metal of lower strength and/or modulus of elasticity. The seal members may be spaced axially along the seal sleeve and/or the tubing such that when the seal is coupled to the tubing sections, a plurality of seals may be defined, adjacent seals optionally having different material properties.

Furthermore, whilst the present invention is described herein in relation to expandable tubing, it will be understood that the principles of the invention may equally be employed with non-expandable tubing, such as non-expandable downhole tubing (for example, conventional casing, liner or the like), or indeed with other types of tubing not found in the downhole environment, such as pipeline.

The invention claimed is:

1. A method of sealing a joint between expandable tubing sections, the method comprising:
    mounting a seal and a sleeve on one of the tubing sections and then moving the seal from a first configuration to a second, non-sealing configuration, wherein the sleeve covers a first portion of the seal;
    coupling expandable tubing sections together; and
    returning the seal to the first configuration to seal the coupled expandable tubing sections.

2. The method as claimed in claim 1, further comprising locating the seal with a portion extending beyond an end of one of the tubing sections prior to coupling the sections together.

3. The method as claimed in claim 1, further comprising restraining the seal against axial movement in at least one direction.

4. The method as claimed in claim 1, further comprising clamping the seal to a tubing section.

5. The method as claimed in claim 1, wherein the step of locating the seal around the expandable tubing sections provides at least an initial seal of a joint between the sections.

6. The method as claimed in claim 1, further comprising expanding the tubing sections to compress the seal and seal the joint.

7. The method as claimed in claim 1, wherein the non-sealing configuration is a folded configuration.

8. The method as claimed in claim 1, wherein the sleeve on the first portion of the seal is configured to restrain the seal against axial movement.

9. The method as claimed in claim 8, wherein the sleeve has a higher yield strength than the seal.

10. The method as claimed in claim 1, wherein the seal includes a reinforcing member.

11. The method as claimed in claim 10, wherein the reinforcing member is formed integrally with the seal.

12. The method as claimed in claim 1, further including placing a plurality of wires around a portion of the seal.

13. The method as claimed in claim 1, further including providing a clamping force on the seal member by utilizing a plurality of wires.

14. The method as claimed in claim 1, wherein the sleeve extends substantially over the joint when the seal member is in the first configuration.

15. The method as claimed in claim 1, wherein the seal has a uniform cross-section.

16. The method as claimed in claim 1, wherein a second portion of the seal folds over the first portion in the non-sealing configuration.

17. The method as claimed in claim 1, wherein the seal is configured to contact and form a sealing relationship with the expandable tubing sections.

18. A method of locating an expandable tubing in a borehole, the method comprising:
    mounting a seal and a restraining member on an expandable tubing section and then moving the seal from a first configuration to a second, folded configuration, wherein the restraining member covers a first portion of the seal;
    coupling the tubing section to another tubing section;
    moving the seal from the folded configuration to the first configuration around a joint between adjacent tubing sections;
    locating the expandable tubing in the borehole; and expanding at least part of the expandable tubing, compressing the at least one seal between the borehole and the expandable tubing.

19. The method as claimed in claim 18, further comprising restraining the seal against axial movement in at least one direction.

20. The method as claimed in claim 18, further comprising clamping the seal to the expandable tubing section.

21. The method as claimed in claim 18, further including placing a sleeve on a portion of the seal.

22. The method as claimed in claim 18, wherein the seal includes an integral reinforcing member.

23. The method as claimed in claim 18, further including placing at least one wire around a portion of the seal to clamp the seal member to the tubing section.

24. The method as claimed in claim 18, wherein a second portion of the seal folds over the first portion in the folded configuration.

25. The method as claimed in claim 18, wherein the restraining member is configured to restrain the seal against axial movement.

26. A method of locating an expandable tubing in a borehole, the method comprising:

coupling a first and a second expandable tubing section together, the first expandable tubing having a seal member overlapping and extending from an end thereof, the seal member having a first portion and a second portion, the second portion having a reinforcing member embedded therein, wherein the seal member is moved from an extended position to a folded position such that the second portion folds over the first portion prior to coupling the tubing sections together;

utilizing the seal member to create a seal at a joint between the expandable tubing sections by returning the seal member to the extended position;

locating the expandable tubing in the borehole; and expanding at least a portion of the expandable tubing sections.

27. The method as claimed in claim 26, further comprising compressing the at least one seal between the borehole and the expandable tubing.

28. The method as claimed in claim 26, wherein the joint is a threaded connection and the seal straddles the threaded connection.

29. The method as claimed in claim 26, wherein the reinforcing member is configured to urge the seal into sealing engagement with the expandable tubing.

* * * * *